Figure 1:
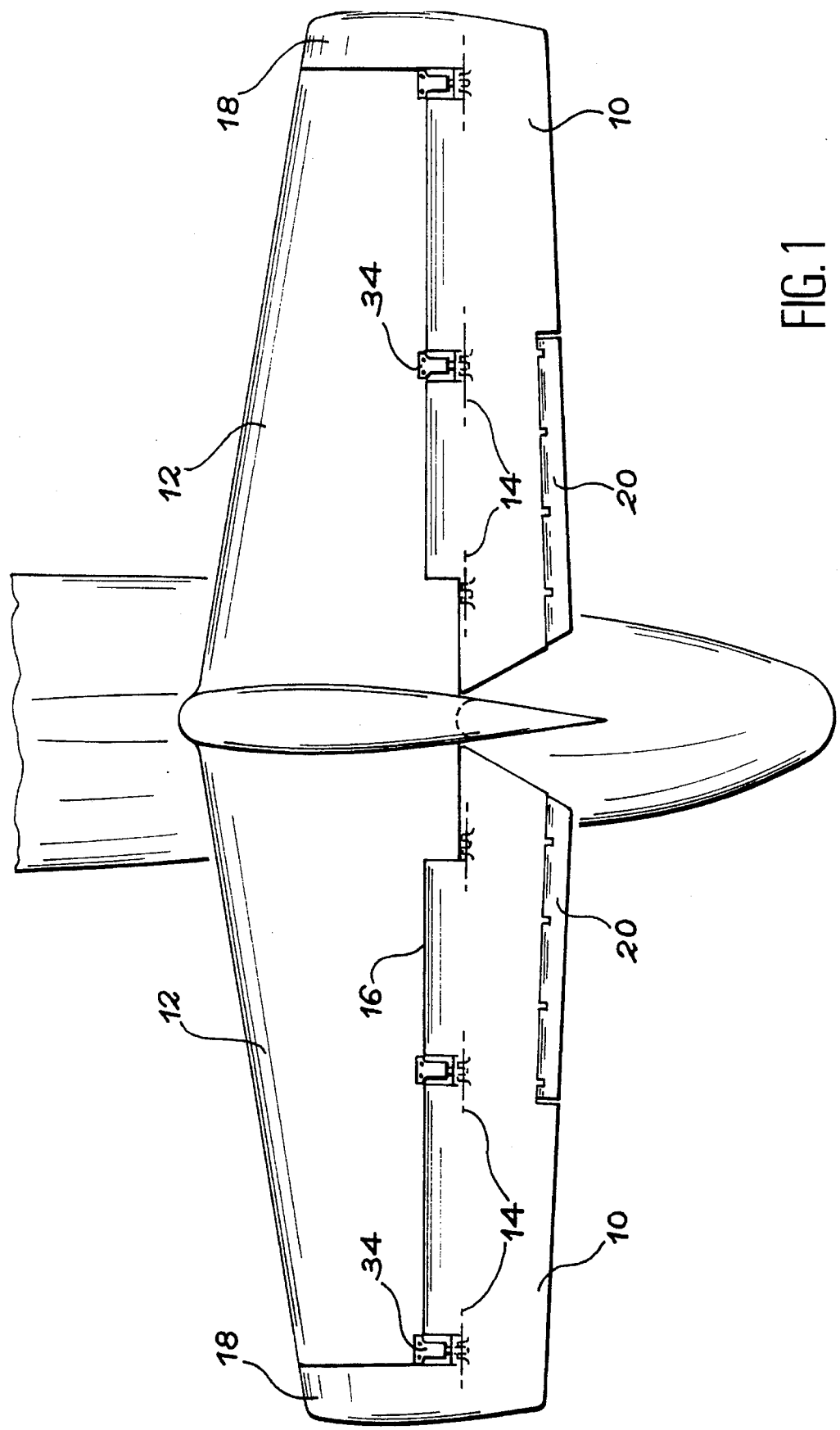

United States Patent [19]

Chavanne et al.

[11] Patent Number: 5,622,336
[45] Date of Patent: Apr. 22, 1997

[54] DEVICE FOR THE PROTECTION OF A CONTROL SURFACE HINGE PARTICULARLY FOR AN AIRCRAFT

[75] Inventors: Jean L. Chavanne, La Salvetat Saint Gilles; Daniel Bonenfant, Aussonne, both of France

[73] Assignee: Aerospatiale Societe Nationale Industrielle, Paris Cedex, France

[21] Appl. No.: 421,985

[22] Filed: Apr. 14, 1995

[30] Foreign Application Priority Data

Apr. 18, 1994 [FR] France .................................. 94 04594

[51] Int. Cl.⁶ .................................................. B64C 1/00
[52] U.S. Cl. .................... 244/129.1; 244/212; 244/215
[58] Field of Search ............................. 244/212, 129.1, 244/215, 213, 130, 121, 204; 16/221

[56] References Cited

U.S. PATENT DOCUMENTS

| | | | |
|---|---|---|---|
| 2,368,702 | 2/1945 | Bourne | 244/130 |
| 2,461,745 | 2/1949 | Lang | 244/130 |
| 4,213,587 | 7/1980 | Roeseler et al. | 244/131 |
| 4,470,366 | 9/1984 | Williams | 244/215 |
| 5,222,692 | 6/1993 | Glowacki | 244/129.1 |
| 5,253,828 | 10/1993 | Cox | 244/212 |

FOREIGN PATENT DOCUMENTS

| | | |
|---|---|---|
| 0397428 | 11/1990 | European Pat. Off. . |
| 524814 | 9/1921 | France . |
| 2238026 | 5/1991 | United Kingdom . |

Primary Examiner—Andres Kashnikow
Assistant Examiner—Tien Dinh
Attorney, Agent, or Firm—Michael N. Meller

[57] ABSTRACT

In order to reduce the force to be applied to the control member of a control surface (10) articulated to a support structure (12) by hinges located in notches or slots (28) formed in the leading edge (16) of the control surface, a protection device is associated with the said hinge. This device has a cover plate (32) fixed to each outer face of the support structure (12), as well as a fairing member (42) fixed to the control surface (10), so as to surround the hinge. The cover plate (32) has grooves (40) which will break in the case of locking. The breaking of the grooves is applicable to any craft moving in a fluid and having control surfaces and more particularly to aircraft.

9 Claims, 4 Drawing Sheets

DEVICE FOR THE PROTECTION OF A CONTROL SURFACE HINGE PARTICULARLY FOR AN AIRCRAFT

The invention relates to a device designed for protecting the control surface hinge of a craft able to travel in a fluid, such as an aircraft, missile, ship, submarine, etc. More specifically, the invention relates to a protection device making it possible to reduce the hinge moment or torque coefficient of the control surface and regulate and linearize the variations of this coefficient as a function of the turning angle of the control surface.

Certain aircraft are equipped with control surfaces not having servo-controls. In this case for each type of control surface and independently of the aircraft size, the regulations insist that the maximum force applied to the control member of the control surface remains compatible with the muscular force which can be produced by the pilot. This maximum force is dependent not only on the type of control surface involved, but also the means likely to be used by the pilot in order to ensure the control (one hand, two hands, feet, etc.).

For an aircraft having given characteristics, the force which has to be applied to the control member of each of the control surfaces is proportional to the hinge moment coefficient CmC of said control surface. For example, for a large capacity passenger aircraft, a variation of 0.01 in the hinge moment coefficient of the elevator can lead to a variation of approximately 10 kg in the force which has to be applied to the control member.

On the basis of this observation it is desirable to reduce the hinge moment coefficients of non-servocontrolled control surfaces of aircraft in order to keep the forces required of pilots within the limits fixed by the regulations. It is also desirable to regulate and linearize the variations of these coefficients occurring during the turning of the control surfaces.

Three methods are at present used, usually in combination, for limiting the hinge moment coefficients of control surfaces to values which are as low as possible and in order to ensure that these coefficients do not increase excessively and in an uncontrolled manner when the turning or steering angles of the control surfaces increase.

The first method consists of rearwardly displacing the pivoting axis of the control surface relative to its leading edge.

The second method consists of giving the leading edge one or more projecting parts known as "projecting or masked horns".

The third method consists of equipping the control surface, on its trailing edge, with an articulated tab, which turns in the reverse direction to the control surface.

The combined use of these three methods makes it possible to reduce by approximately 90% the forces which have to be applied to the control member in order to manipulate a control surface deflected by 20°, in the case of a large capacity passenger aircraft.

Bearing in mind the evolution of the materials used in aeronautics (composite materials) and the manufacturing and control methods associated therewith, the characteristics of the same aircraft fleet are becoming ever more homogeneous, so that the risks of the control surfaces of certain aircraft not meeting the regulations concerning the acceptable force level required on control members are increasingly small.

However, each of the hinges by which the control surface is articulated to the aircraft structure constitutes a random, uncontrolled variation source with respect to the hinge moment or torque coefficient. Thus, each hinge introduces functional discontinuities consisting of a functional clearance in the transverse direction, a profile discontinuity due to the displacement of the axis of the articulation towards the rear with respect to the leading edge, as well as an interruption of said leading edge. Said functional discontinuities constitute local separation sources for the limiting layer. They consequently reduce the effect of the three aforementioned methods for reducing the hinge moment coefficients. Thus, there is an efficiency loss of the tab under high deflection, as well as pulsations of the control surfaces which are prejudicial to piloting.

The invention specifically relates to a protection device for a control surface hinge designed for limiting and stabilizing the functional discontinuities inevitably introduced by said hinge, so as to ensure that the regulations relative to the maximum admission force on the control members are respected, said device being appropriate both for existing aircraft and for new aircraft without giving rise to any significant modification and without any risk of the control surfaces locking, particularly under the effect of frost.

According to the invention, this result is obtained by means of a device for the protection of a hinge by which a control surface is articulated to a structure of a craft able to move in a fluid, the hinge being located in a notch formed in a leading edge of the control surface, said device comprising at least one cover plate fixed to the structure and partly covering the notch, characterized in that the cover plate forms a calibrated clearance with the lateral edges of the notch and has, in the vicinity of these lateral edges, reduced resistance zones ensuring the breaking of the cover plate under the effect of a force exceeding a given value.

The use of a cover plate forming a calibrated clearance with the lateral edges of the notch makes it possible to improve and stabilize the aerodynamic behaviour of the control surface at the location of the hinge. Consequently the hinge moment coefficient is reduced and its evolution as a function of the turning angle is regulated and linearized. It is therefore easier to satisfy the regulations limiting the force level applied to the control members.

Moreover, the existence of reduced resistance zones in the vicinity of the lateral edges of the closing plate makes it possible to ensure in all circumstances the operation of said control surface, even in the case of a mechanical locking due to an external agent such as frost, due to the small clearance existing between the cover plate and the lateral edges of the notch.

In a preferred embodiment of the invention, the cover plate has a tongue fixed to the structure and two strips fixed to the tongue and defining the aforementioned calibrated clearance with the lateral edges of the notch. The reduced resistance or strength zones are then formed on these strips.

In this preferred embodiment of the invention, each of the reduced resistance zones has a groove formed on each strip, substantially parallel to a straight edge of the latter turned towards a lateral edge facing the notch.

The strips are then made from a friable material such as rubber, Plexiglass (registered trademark), carbon, Kevlar (registered trademark), etc.

Advantageously, in order to further reduce the hinge moment coefficient and further improve the regulation and linearity of its variations as a function of the control surface turning angle, the protection device also has at least one fairing part fixed to the control surface, in the vicinity of the bottom of the notch, so as to connect two opposite faces of the control surface in accordance with an inwardly curved profile. A calibrated window, e.g. substantially shaped like a rectangle, is then formed in the fairing member in order to permit the passage of a stub connecting the hinge to the structure.

In the preferred embodiment of the invention, the fairing member has two plates with an inwardly curved section, respectively fixed to each of the opposite faces of the control surface and two foil sheets with an inwardly curved section connecting the plates with the inwardly curved section on either side of the calibrated window.

The invention is described in greater detail hereinafter relative to a non-limitative embodiment and with reference to the attached drawings, wherein show:

FIG. 1 A plan view showing the tail section of an aircraft, whose elevators are installed on the structure by means of hinges equipped with protection devices according to the invention.

Figure 2:
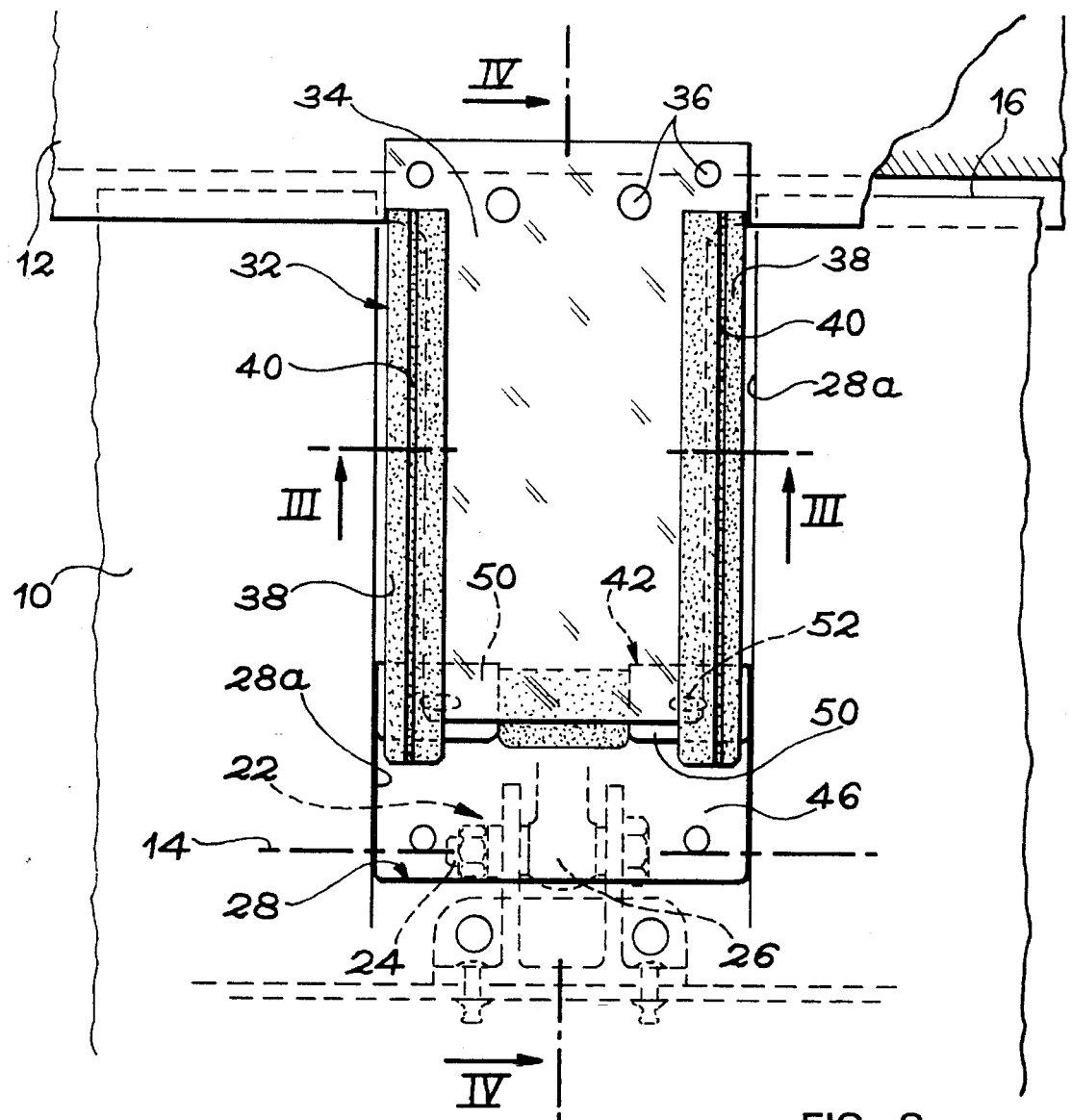

FIG. 2 A larger scale, plan view illustrating the hinge of one of the elevators of FIG. 1 and the associated protection device.

Figure 3:
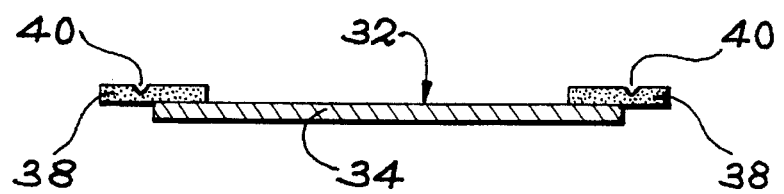

FIG. 3 A sectional view along line III—III of FIG. 2.

Figure 4:
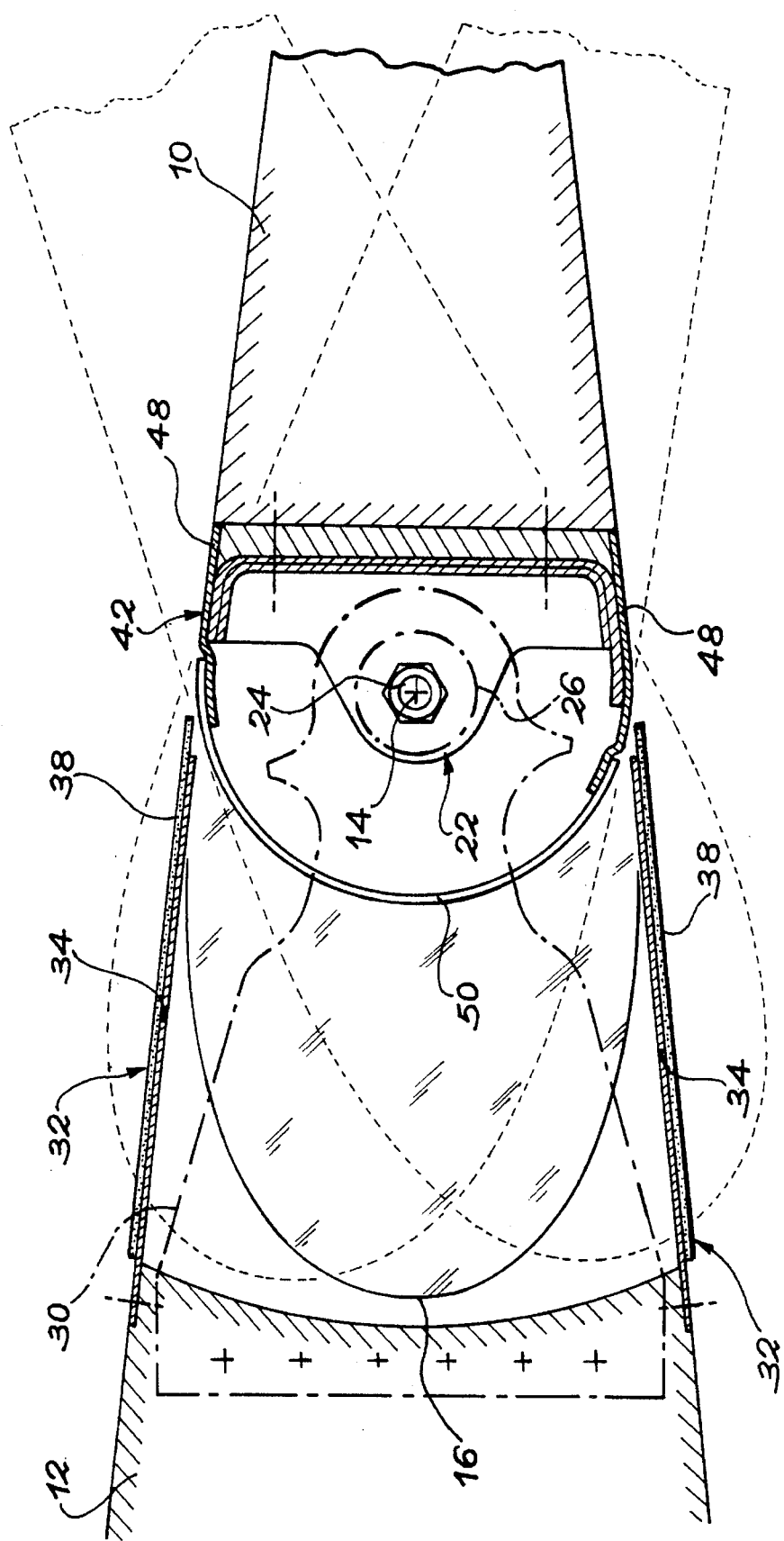

FIG. 4 A section along line IV—IV of FIG. 2.

Figure 5:
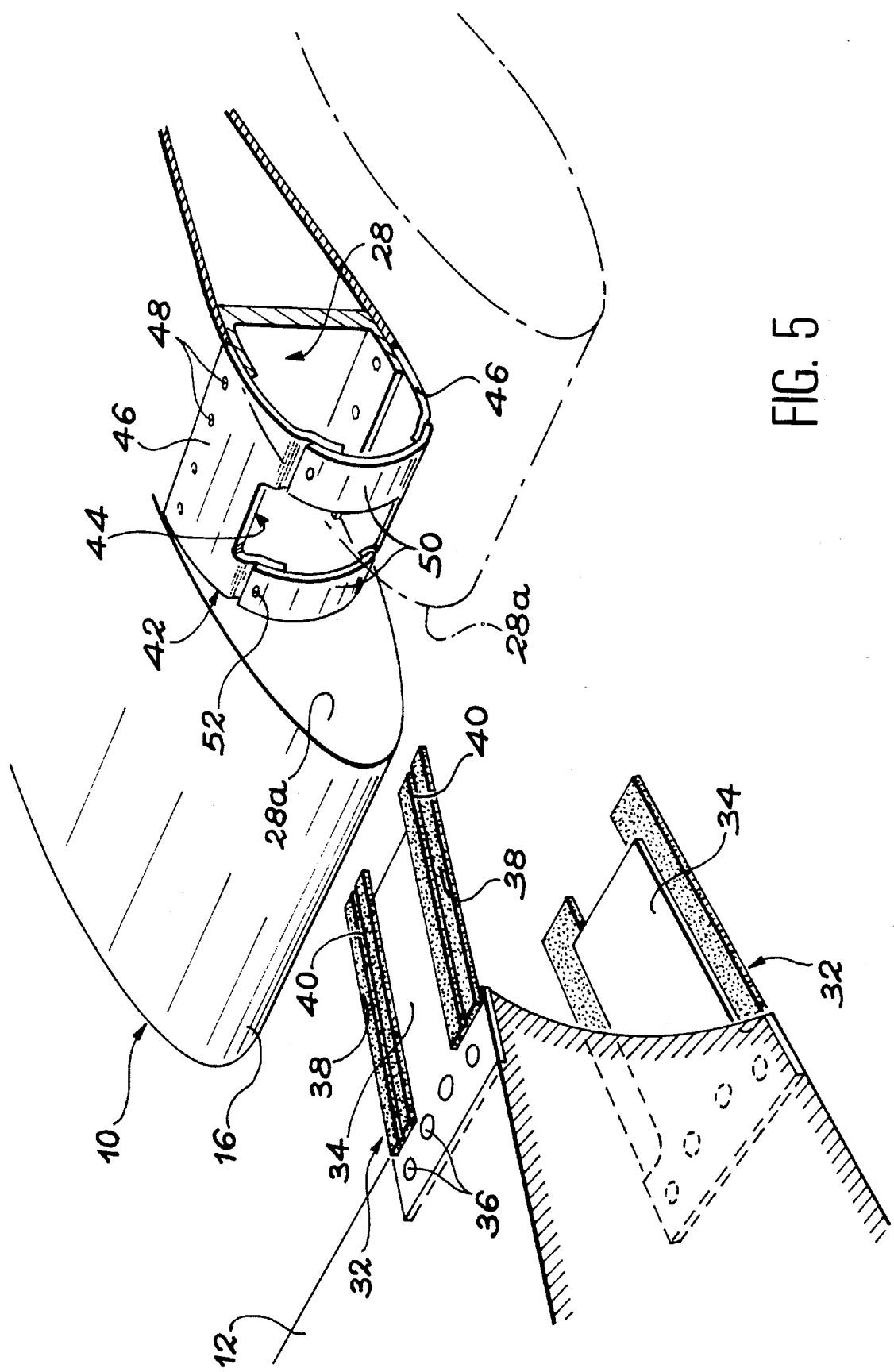

FIG. 5 An exploded perspective view showing the parts of the protection device according to the invention installed on the control surface and on the structure supporting the latter, the hinge as well as the stub connecting it to the support structure being deliberately omitted.

The drawings illustrate the case where the protection device according to the invention is placed on the hinges by which the elevators 10 of an aircraft are articulated to a tail structure 12. However, the invention is also applicable to other control surfaces of aircraft, as well as to control surfaces equipping craft of different types such as missiles, ships or submarines.

In order to reduce to the greatest possible extent according to standard technologies the hinge moment or torque coefficients of each of the control surfaces 10, the three standard methods are preferably used together, as illustrated in FIG. 1. Thus, The geometrical axis 14 by which each of the control surfaces or elevators 10 is articulated to the structure 12 is rearwardly displaced with respect to the leading edge 16 of the control surfaces. Moreover, each of the control surfaces 10 carries at its end a projecting horn 18. Finally, a tab 20 is articulated to the part of the trailing edge of each of the control surfaces 10 closest to the longitudinal axis of the aircraft.

In order to further reduce the hinge moment coefficient, as well as regulate and linearize these variations as a function of the turning angle of each of the control surfaces, according to the invention the three standard methods are supplemented by the addition of a protection device about each of the hinges 22 (FIG. 2) by which the control surfaces are articulated to the structure 12.

As illustrated in FIGS. 2 and 4, the geometrical axis 14 by which each of the elevators 10 is articulated to the corresponding structure 12 is materialized by hinges 22, each incorporating a spindle 24 carried by the elevator 10 and a bearing 26 carried by the structure 12 and in which the spindle 24 is received in pivoting manner.

In order to take account of the rearward displacement of the geometrical axis 14 with respect to the leading edge 16 of the control surface or elevator 10, each of the hinges 22 is positioned in the bottom of a notch or slot 28 formed in the leading edge 126 and the bearing 26 is installed on the trailing edge of the structure 12 by means of a stub 30. The notch 28 traverses the elevator 10 over its entire height and has in plan view two parallel, lateral edges 28a (FIG. 2).

Bearing in mind this arrangement and as has already been indicated, the hinges 22 are the origin of functional discontinuities, which tend to increase the force having to be applied to the control member for high turning angles and produce pulsations which are disturbing to the piloting operation. These functional discontinuities are transverse clearances necessarily existing in hinges, the profile discontinuities resulting from the presence of the notches 28 and the interruptions of the leading edge 16.

According to the invention, these functional discontinuities are reduced to the strict minimum by associating with each of the hinges 22 a protection device which will now be described in conjunction with FIGS. 2 to 5.

For each of the hinges 22, said protection device firstly has two cover plate 32 fixed to the structure 10. As illustrated more particularly in FIG. 5, the cover plates 32 project rearwardly of the structure 12 in the extension of the upper and lower surfaces of said structure. They cover most of the notch 28 in which is housed the hinge 22.

In the preferred embodiment illustrated in the drawings, which relates to the equipping of an existing aircraft, each of the cover plates 32 has a substantially planar tongue 34 fixed to the structure 12, e.g. by means of rivets 36. Such a metal tongue 34 already exists on most aircraft. In its portion positioned vertically of the notch 28, each of the tongues 34 has a substantially rectangular shape and its lateral edges are spaced from the lateral edges 28a of the notch 28 by a considerable distance, e.g. approximately 12.3 mm.

According to the invention, each of the cover plates 32 also has two substantially planar strips 38 shaped like an elongated rectangle. Each of these strips 38 is fixed to the tongue 34, e.g. by means of not shown rivets along the lateral edges of said tongue, so as to project beyond said lateral edges, forming with the lateral edges 28a of the notch 28 a reduced width, calibrated clearance of e.g. approximately 3 mm. The clearance between each of the cover plates 32 and the lateral edges of the notch 28 is therefore reduced to a minimum value not impeding the pivoting of the control surface or elevator 10 about the geometrical axis 14.

In practice, the strips 38 are made from a friable material such as rubber, Plexiglass (registered trademark), carbon, Kevlar (registered trademark), etc.

In addition and as is more particularly illustrated in FIG. 3, each of the strips 38 has reduced resistance or strength zones positioned slightly to the outside with respect to the lateral edges of the tongue 34. These reduced strength zones are parallel to the lateral edges of the strips 38 turned towards the lateral edges 28a of the notch 28. They are e.g. formed by straight grooves 40 having a V-shaped cross-section.

These grooves 40 extend over the entire width of the strips 38. As a result of the friable nature of the material forming the strips, the grooves 40 consequently allow the breaking of the strips when a mechanical locking occurs, as a result of an external agent such as frost. Therefore the operation of the control surfaces 10 is ensured in all circumstances, despite the reduction of the clearances between the cover plates 32 and the lateral edges of the notches 28 to a minimum value.

It should be noted that the strips 38 can be extended slightly beyond the end of the tongue 34, as illustrated in the drawings, or can terminate level with said end. Furthermore, although the tongue 34 is generally constituted by a tongue already existing on the aircraft, said existing tongue can also be replaced by a longer tongue or by a cover plate having both the characteristics of the tongue 34 and the strips 38. In other words, the cover plate is then a single plate, whose dimensions make it possible to limit the transverse clearance between said plate and the lateral edges 28a of the notch 28 to a minimum calibrated value, said single plate having reduced strength zones allowing a breaking of lateral bands adjacent to the edges 28a. This latter case also applies to the creation of a new aircraft or any other craft able to move in a fluid.

In addition to the cover plates 32, the protection device according to the invention also advantageously has a fairing member 42 fixed to the control surface 10. This fairing member 42 completely surrounds the hinge 22, with the exception of a passage for the stub 30, consisting of a rectangular, calibrated window 44. The dimensions of the calibrated window 44 are determined in such a way as to provide the stub 30 by which the bearing 26 is connected to the structure 12 just enough passage for the maximum travel of the control surface 10.

The fairing member 42 has a substantially semicircular, inwardly curved profile extending, without discontinuity, the upper and lower surfaces of the control surface 10 level with the bottom of the notch 28.

In the preferred embodiment illustrated in the drawings, the fairing member 42 has two plates 46 with an inwardly curved section, respectively fixed to the lower and upper surfaces of the elevator 10, e.g. by means of rivets 48. Each of the plates 46 extends over the entire width of the notch 28 and has in plan view substantially the shape of a rectangle. The front edge of each of the plates 46 has two lateral, projecting portions, to which are fixed two foil sheets 50, having an inwardly curved section, interconnecting the plates 46 on either side of the calibrated window 44. The foil sheets 50 are fixed to the plates 46, e.g. by rivets 52.

In the preferred embodiment illustrated in the drawings and which relates to the case of an existing aircraft, the upper and lower surfaces of the elevator 10 generally already carry the plates 46. Therefore the fairing member 42 is obtained by merely attaching to said plates 46 the foil sheets 50. As a variant, existing plates 46 can be replaced by plates extending towards the front or by a fairing member made in one piece and replacing the plates 46 and foil sheet 50. The latter solution is also applicable in the case of a new aircraft design.

Obviously, the invention is not limited to the embodiment described in exemplified manner here, but covers all variants thereof. In particular and as has already been stated, the device according to the invention can be used in order to protect the hinges of a control surface of a random craft able to move in a fluid such as air or water.

We claim:

1. In a craft movable in a fluid comprising a craft structure and an assembly comprising:

a control surface having a leading edge wherein:

at least one notch is formed in the leading edge; the at least one notch having lateral edges;

a hinge located in the at least one notch, the hinge enabling the control surface to be articulated to the craft structure; and a device for protecting the hinge; said device including at least one cover plate; the at least one cover plate being adapted to be fixed only to the craft structure and partly covering the at least one notch; wherein:

two calibrated clearances are defined between lateral edges of the at least one cover plate and the lateral edges of the at least one notch; and the at least one cover plate comprises:

two breakable lateral bands formed between the lateral edges of the at least one cover plate and reduced resistance lateral zones located in a vicinity of the lateral edges of the at least one cover plate and extending substantially parallel to the lateral edges of the at least one cover plate, whereby the two breakable lateral bands are adapted to be broken when subjected to a force exceeding a given value.

2. In the craft according to claim 1, wherein the strips comprise a friable material.

3. In a craft according to claim 1, further comprising at least one fairing member fixed to the control surface, in a vicinity of a bottom of the at least one notch, so as to connect two opposite faces of the control surface in accordance with an inwardly curved profile;

a calibrated window being formed in said at least one fairing member to permit a passage of a stub which connects the hinge to the craft structure.

4. In a craft according to claim 3, wherein the calibrated window has a substantially rectangular shape.

5. In a craft according to claim 3, wherein the at least one fairing member comprises two plates and an inwardly curved section, respectively fixed to each of the opposite faces of the control surface, and two foil sheets with an inwardly curved section, connecting said two plates with an inwardly curved section, positioned on each side of the calibrated window.

6. In a craft movable in a fluid and comprising a craft structure, an assembly comprising:

a control surface having a leading edge wherein:

at least one notch is formed in the leading edge; the at least one notch having lateral edges;

a hinge located in the at least one notch, the hinge enabling the control surface to be articulated to the craft structure; and a device for protecting the hinge; said device including:

at least one cover plate;

the at least one of cover plate being adapted to be fixed to the craft structure and partly covering the at least one notch;

two calibrated clearances defined between lateral edges of the at least one cover plate and the lateral edges of the at least one notch; and the at least one cover plate comprises a tongue fixed to the craft structures and two strips fixed to the tongue and defining the two calibrated clearances with the lateral edges of the at least one notch, and a plurality of reduced resistance zones are formed on each of said two strips; and wherein:

the plurality of reduced resistance lateral zones comprise grooves formed in each of the two strips to be substantially parallel to a lateral edge of each of the two strips and turned in a direction toward a lateral edge facing the notch, two breakable lateral bands formed between the lateral edges of the at least one cover plate and reduced resistance lateral zones located in a vicinity of the lateral edges of the at least one cover plate and extending substantially parallel to the lateral edges of the at least one cover plate, whereby the two breakable lateral bands are adapted to be broken when subjected to a force exceeding a given value.

7. In a craft according to claim 6, wherein at least the two lateral bands of the at least one cover plate are formed of a friable material.

8. In a craft movable in a fluid and comprising a craft structure, an assembly comprising:

a control surface having a leading edge wherein:

at least one notch is formed in the leading edge; the at least one notch having lateral edges;

a hinge located in the at least one notch, the hinge enabling the control surface to be articulated to the craft structure; and a device for protecting the hinge; said device including:
at least one cover plate;
the at least one cover plate being adapted to be fixed to the craft structure and partly covering the at least one notch;
two calibrated clearances defined between the lateral edges of the at least one cover plate and the lateral edges of the at least one notch; and
the at least one cover plate comprises two breakable lateral bands formed between the lateral edges of the at least one cover plate and reduced resistance lateral zones located in a vicinity of the lateral edges of the at least one cover plate and extending substantially parallel to the lateral edges of the at least one cover plate, whereby the two breakable lateral bands are adapted to be broken when subjected to a force exceeding a given value; and the assembly further comprising at least one fairing member fixed to the control surface, in a vicinity of a bottom of the at least one notch, so as to connect to opposite faces of the control surface in accordance with an inwardly curved profile; a calibrated window being formed in said fairing member to permit a passage of a stub which connects the at least one hinge to the craft structure.

9. In a craft according to claim 8, wherein at least the two lateral bands of the at least one cover plate are formed of a friable material.

* * * * *